(12) United States Patent
Yeager et al.

(10) Patent No.: US 7,834,134 B2
(45) Date of Patent: Nov. 16, 2010

(54) POLYARYLETHERS, BLENDS AND METHODS FOR MAKING

(75) Inventors: Gary William Yeager, Rexford, NY (US); Daniel Steiger, Bedminster, NJ (US); Yanshi Zhang, Shaker Heights, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/191,236

(22) Filed: Aug. 13, 2008

(65) Prior Publication Data

US 2010/0041838 A1 Feb. 18, 2010

(51) Int. Cl.
*C08G 75/00* (2006.01)

(52) U.S. Cl. .................. 528/391; 528/422; 528/425; 525/534; 525/535; 525/540

(58) Field of Classification Search .................. 525/534
See application file for complete search history.

(56) References Cited

U.S. PATENT DOCUMENTS

| | | | |
|---|---|---|---|
| 3,251,806 A | 5/1966 | Parker | |
| 4,051,300 A | 9/1977 | Klein et al. | |
| 4,361,484 A | 11/1982 | Larsson et al. | |
| 4,663,427 A | 5/1987 | Matsuo et al. | |
| 4,961,852 A | 10/1990 | Pemawansa et al. | |
| 5,071,448 A | 12/1991 | Bikson et al. | |
| 5,076,935 A | 12/1991 | Kraus et al. | |
| 5,114,585 A | 5/1992 | Kraus et al. | |
| 5,158,721 A | 10/1992 | Allegrezza, Jr. et al. | |
| 5,178,765 A | 1/1993 | Hu et al. | |
| 5,807,944 A | 9/1998 | Hirt et al. | |
| 5,911,880 A | 6/1999 | Klein et al. | |
| 6,051,661 A | 4/2000 | Weber et al. | |
| 6,214,382 B1 | 4/2001 | Eguchi et al. | |
| 7,098,266 B2 | 8/2006 | Weber et al. | |
| 7,393,914 B2 | 7/2008 | Moore et al. | |
| 7,547,756 B2 | 6/2009 | Hung et al. | |
| 2002/0147282 A1 | 10/2002 | Mayes et al. | |
| 2004/0026314 A1 | 2/2004 | Kobayashi et al. | |
| 2005/0037132 A1 | 2/2005 | Horres et al. | |
| 2005/0064038 A1 | 3/2005 | Dinh et al. | |
| 2005/0069780 A1 | 3/2005 | Kinouchi et al. | |
| 2006/0138044 A1 | 6/2006 | Krause et al. | |
| 2006/0264355 A1 | 11/2006 | Storr et al. | |
| 2007/0112169 A1 | 5/2007 | Brunelle et al. | |
| 2007/0112170 A1 | 5/2007 | Brunelle et al. | |
| 2007/0142613 A1 | 6/2007 | Hung et al. | |
| 2007/0142614 A1 | 6/2007 | Hung et al. | |
| 2007/0238856 A1 | 10/2007 | Moore et al. | |
| 2008/0004443 A1 | 1/2008 | Brunelle et al. | |
| 2008/0114149 A1 | 5/2008 | Moore et al. | |
| 2008/0114183 A1 | 5/2008 | Moore et al. | |
| 2008/0135481 A1 | 6/2008 | Steiger et al. | |
| 2008/0142418 A1 | 6/2008 | Zhang et al. | |
| 2008/0142429 A1 | 6/2008 | Zhang et al. | |
| 2008/0203012 A1* | 8/2008 | Yeager et al. | 210/500.36 |

FOREIGN PATENT DOCUMENTS

| | | |
|---|---|---|
| DE | 19961040 A1 | 6/2001 |
| EP | 855428 A1 | 7/1998 |
| EP | 855429 A1 | 7/1998 |
| EP | 855430 A2 | 7/1998 |
| WO | 00/54103 A1 | 9/2000 |
| WO | 03046080 A1 | 5/2003 |

OTHER PUBLICATIONS

U.S. Appl. No. 12/191,211, filed Aug. 13, 2008, Gary William Yeager.
U.S. Appl. No. 12/191,252, filed Aug. 13, 2008, Gary William Yeager.
Weber, Martin In Situ Polyamide d/polysulfone-alloys. 59th Annual Technical Conference—Society of Plastics Engineers 2001, vol. 2 pp. 2222-2226.
Charonensirisomboon, P., Inoue, et al., Pull-out Copolymer in Situ-Formed During Reactive Blending:Effect of the Copolymer Architecture. Polymer 2000, vol. 41, pp. 6907-6912.
Koch, Thomas; Ritter, Helmut. Functionalized Polysulfones from 4,4-bis (4-hydroxyphenyl) Pentanoic Acid, 2-2-Isopropylidendiphenol and Bis(4-chlorophenyl) Sulfone: Synthesis, Behavior and Polymer Analogous Amidation of the Carboxylic Groups. Macromolecular Chemistry and Physics 1994, vol. 195 pp. 1709-1717.
Esser, Isabelle C.H. M.; Parsons, Ian W., Modified Poly(ether ether sulfone) Polymers: Approaches to Pendant Carboxyl Groups. Polymer 1993, vol. 34, pp. 2836-2844.
Rodewald, B; Ritter, H. Oligo (ether sulfones). 3 Block Copolymers via Condensation Reactions of Telechelic Oligo (ether sulfones) Bearing Phenolic Endgroups and Oligimeric a,w-Diols.m Macromolecules 1999, vol. 32, pp. 1679-1700.
Ritter, H., Rodewald, B., 1. Functionalized Oligo (ether sulfones) from 4,4-bis(4-hydroxyphenyl) Pentanoic Acid and bis (4-chlorophenyl) Sulfone: Synthesis, Properties, and Substitution of the Chlorophenyl Endgroups. Macromolecular Reports 1996 A 33 Suppl. 2, pp. 103-115.
Waring, Derek M.H., Polyarlene Ether Ionomers. Defensive Publication U.S. Patent Office 1971.

* cited by examiner

*Primary Examiner*—Randy Gulakowski
*Assistant Examiner*—Kyle Baumstein
(74) *Attorney, Agent, or Firm*—GE Global Patent Operation; Catherine J. Winter

(57) ABSTRACT

A method for making a polyarylether block copolymer having amide functionality including reacting a dihydroxyaromatic compound having amide functionality and a dihaloaromatic sulfone or dinitroaromatic sulfone in the presence of a base to form a polyarylether having amide functionality and reacting the polyarylether having amide functionality with a polymer. The block copolymer and blends are also provided.

20 Claims, No Drawings

POLYARYLETHERS, BLENDS AND METHODS FOR MAKING

FIELD OF THE INVENTION

The invention relates generally to functional polyarylethers, and more particularly, to polyarylethers having amide functionality.

BACKGROUND OF THE INVENTION

Liquid filtration membranes for aqueous media must be porous, hydrophilic, have excellent mechanical properties to support the membrane during manufacture and use and must have adequate thermal properties to prevent the membrane from degrading during high temperature processes. Furthermore, these membranes must have nonspecific protein binding, such that membrane fouling is minimized. Membrane fouling is a major concern, resulting in reduced efficiency due to flux decline, high cleaning and maintenance costs, and low membrane lifetimes.

Typical membrane materials are hydrophobic and require an additive to make the membrane more hydrophilic. Polysulfones have the mechanical and thermal properties necessary for liquid filtration membranes, but these polymers are insufficiently hydrophilic. To improve their hydrophilicity, polysulfones have been blended with hydrophilic polymers such as polyvinylpyrrollidinone (PVP). However, PVP is water soluble and it is slowly leached from the porous polymer matrix creating product variability.

Thus, improved hydrophilic polymer materials that can be used to fabricate porous and hydrophilic membranes having good mechanical and thermal properties and improved fouling resistance and methods for making the hydrophilic polymer materials are desired.

SUMMARY OF THE INVENTION

In one embodiment, a method for making a polyarylether block copolymer having amide functionality comprises reacting a dihydroxyaromatic compound having amide functionality and a dihaloaromatic sulfone or dinitroaromatic sulfone in the presence of a base to form a polyarylether having amide functionality and reacting the polyarylether having amide functionality with a polymer.

In another embodiment, a polyarylether block copolymer having amide functionality comprises (A) units from at least one of structure I or structure II:

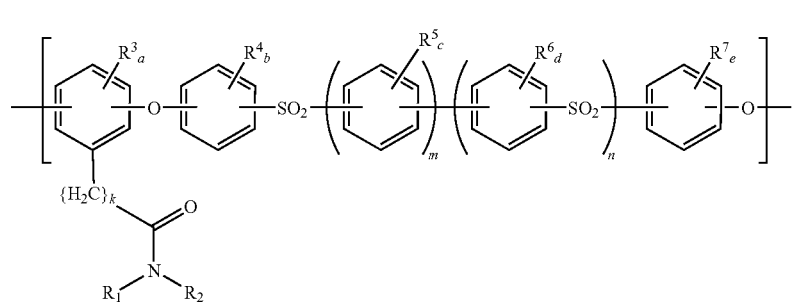

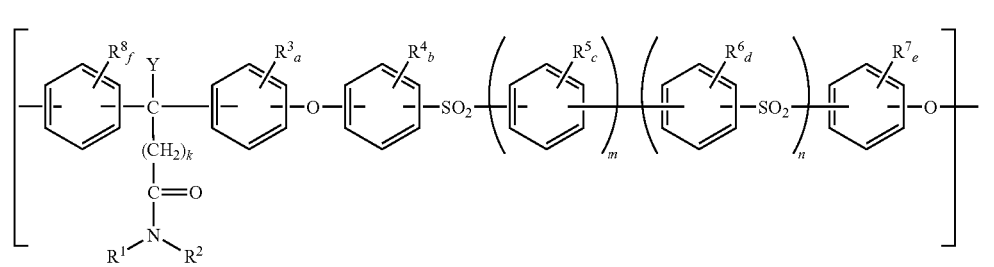

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are independently 0 or 1; and (B) units from a polymer.

In another embodiment, a blend comprises a polyarylether block copolymer having amide functionality and one or more resins, the polyarylether block copolymer having amide functionality comprises units from at least one of structure I or structure II:

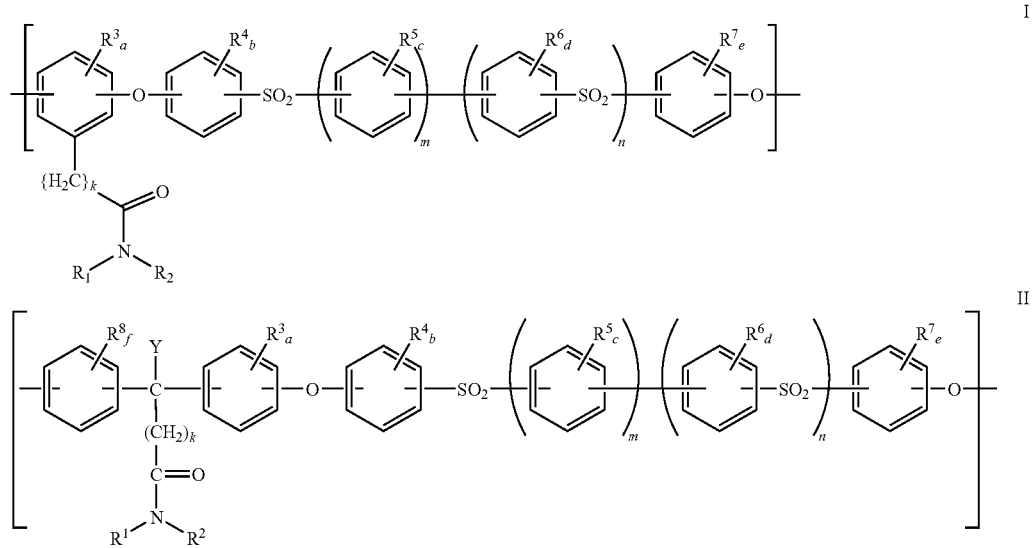

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

In another embodiment, a method for making a blend comprises mixing a polyarylether copolymer having amide functionality and one or more resins, wherein said polyarylether copolymer having amide functionality comprises units from at least one of structure I or structure II:

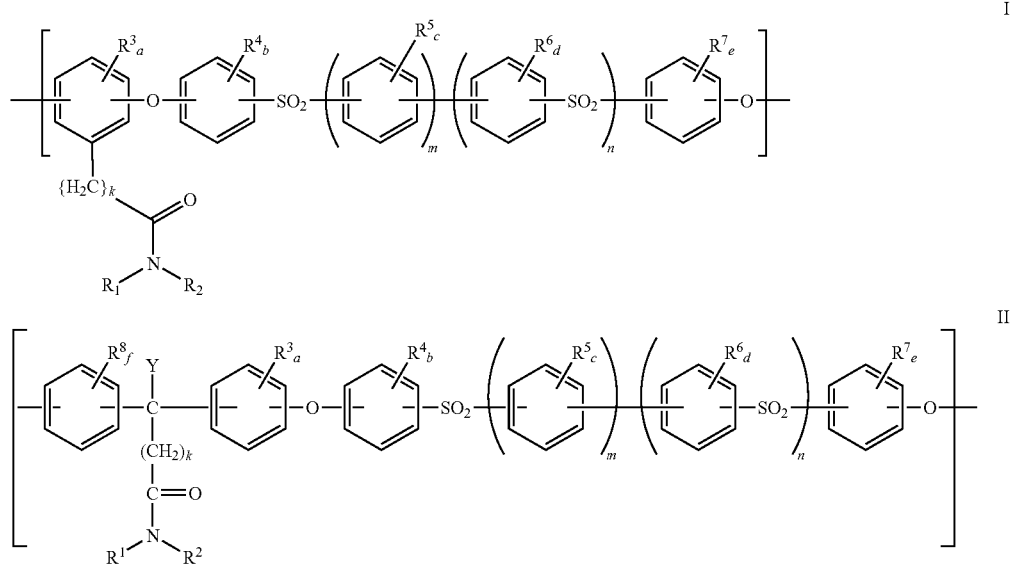

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

The various embodiments provide polyarylether block copolymers having amide functionality, methods for making the polyarylether block copolymers having amide function-

DETAILED DESCRIPTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32, etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a process for preparing a polyarylether block copolymer having amide functionality is provided. The process includes reacting a dihydroxyaromatic compound having amide functionality with a dihaloaromatic sulfone or a dinitroaromatic sulfone in the presence of a base to form a polyarylether having amide functionality and copolymerizing the polyarylether having amide functionality with a polymer to form a block copolymer. A solvent and a phase transfer catalyst may optionally be used.

The dihydroxyaromatic compounds having amide functionality are dihydroxyaromatic compounds where at least one hydrogen is replaced by a functional group containing an amide group. Examples of dihydroxyaromatic compounds include, but are not limited to, bis(4-hydroxyphenyl)sulfide, bis(4-hydroxyphenyl)ether, bis(4-hydroxyphenyl)sulfone, bis(4-hydroxyphenyl)sulfoxide, 4,4'-(phenylphosphinyl)diphenol, 5-cyano-1,3-dihydroxybenzene, 4-cyano-1,3-dihydroxybenzene, 2-cyano-1,4-dihydroxybenzene, 2-methoxyhydroquinone, 2,2'-dimethylbiphenol, 2,2',6,6'-tetramethylbiphenol, 2,2',3,3',6,6'-hexamethylbiphenol, 3,3',5,5'-tetrabromo-2,2',6,6'-tetramethylbiphenol, 2,2-bis(4-hydroxyphenyl)hexafluoropropane, 4,4'-(3,3,5-trimethylcyclohexylidene)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,2-bis(4-hydroxyphenyl)butane, 2,2-bis(4-hydroxyphenyl)-2-methylbutane, 1,1-bis(4-hydroxyphenyl)cyclohexane, 2-(3-methyl-4-hydroxyphenyl-2-(4-hydroxyphenyl)propane, 2-(3,5-dimethyl-4-hydroxyphenyl)-2-(4-hydroxyphenyl)propane, 2-(3-methyl-4-hydroxyphenyl)-2-(3,5-dimethyl-4-hydroxyphenyl)propane, bis(3,5-dimethylphenyl-4-hydroxyphenyl)methane, 1,1-bis(3,5-dimethylphenyl-4-hydroxyphenyl)ethane, 2,2-bis(3,5-dimethylphenyl-4-hydroxyphenyl)propane, 2,4-bis(3,5-dimethylphenyl-4-hydroxyphenyl)-2-methylbutane, 3,3-bis(3,5-dimethylphenyl-4-hydroxyphenyl)pentane, 1,1-bis(3,5-dimethylphenyl-4-hydroxyphenyl)cyclopentane, 1,1-bis(3,5-dimethylphenyl-4-hydroxyphenyl)cyclohexane, bis(3,5-dimethyl-4-hydroxyphenyl)sulfoxide, bis(3,5-dimethyl-4-hydroxyphenyl)sulfone, bis(3,5-dimethylphenyl-4-hydroxyphenyl)sulfide, 2-carbamoylhydroquinone, 2,3-dicarbamoylhydroquinone, 2,2-bis(4-hydroxyphenyl)propane (bisphenol-A), resorcinol, catechol, hydroquinone, 2,6-dihydroxy naphthalene, 2,7-dihydroxynapthalene, 2,4'-dihydroxyphenyl sulfoxide, 2-diphenylphosphinylhydroquinone, bis(2,6-dimethylphenol) 2,2'-biphenol, 4,4'-biphenol, 4,4'-bis(3,5-dimethyl)biphenol, 4,4'-bis(2,3,5-trimethyl)biphenol, 4,4'-bis(2,3,5,6-tetramethyl)biphenol, 4,4'-bis(3-bromo-2,6-dimethyl)biphenol, 4,4'-isopropylidenebis(2,6-dibromophenol) (tetrabromobisphenol A), 4,4'-isopropylidenebis(2,6-dimethylphenol) (tetramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'-isopropylidene-bis(2-phenylphenol), 4,4'(1,3-phenylenediisopropylidene)bisphenol (bisphenol M), 4,4'-(1,4-phenylenediisoproylidene)bisphenol (bisphenol P), 4,4'-sufonylbis(2,6-dimethylphenol), 4,4'-hexafluoroisoproylidene)bisphenol (Bisphenol AF), 4,4'-hexafluoroisopropylidene)bis(2,6-dimethylphenol), 4,4'(1-phenylethylidene)bisphenol (Bisphenol AP), 4,4'-(1-phenylethylidene)bis(2,6-dimethylphenol), 3,3-(4-hydroxyphenyl)pentane, bis(4-hydroxyphenyl)-2,2-dichloroethylene (Bisphenol C), bis(2,6-dimethyl-4-hydroxyphenyl)methane, 4,4'-(cyclopentylidene)diphenol, 4,4'-(cyclohexylidene)bis(2-methylphenol), 4,4'-bis(4-hydroxyphenyl)diphenyl ether, 9,9-bis(3-methyl-4-hydroxyphenyl)fluorene, N-phenyl-3,3-bis-(4-hydroxyphenyl)phthalimide, 4,4'-(cyclododecylidene)diphenol, 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol) or dicyclopentadienyl bisphenol.

In one embodiment, the dihydroxyaromatic compounds having amide functionality have the structure IV or V:

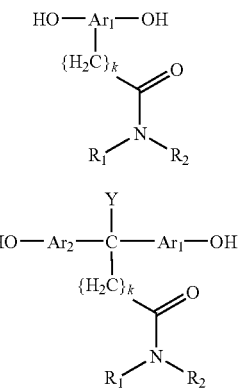

IV

V

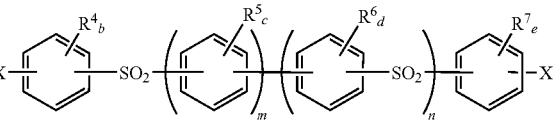

VI wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

k is from about 0 to about 10;

Y is hydrogen, $C_1$-$C_{20}$ alkyl or $C_3$-$C_{30}$ aryl; and $Ar_1$ and $Ar_2$ are each, independently, a $C_3$-$C_{30}$ aryl group, a $C_3$-$C_{30}$ aromatic-aliphatic group or a substituted $C_3$-$C_{30}$ aryl group.

In one embodiment, $R_1$ and/or $R_2$ may be methyl, ethyl, propyl, isopropyl, butyl, hexyl, heptyl, octyl, 4-methylpent-1-yl, phenyl, naphthyl or biphenyl. In another embodiment, $R_1$ and $R_2$ are covalently connected to form a cyclic moiety. In one embodiment, $R_1$ and $R_2$ form a cycloalkyl group. In another embodiment, $R_1$ and $R_2$ form a cyclohexyl group. In another embodiment $R_1$ and $R_2$ are covalently connected through an oxygen atom to form a cyclic moiety. In one embodiment, $R_1$ and $R_2$ form a 6-membered ring containing an oxygen atom. In another embodiment, $R_1$ and $R_2$ form a morpholyl group or a diethylene imidyl oxide ring.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, $Ar_1$ and/or $Ar_2$ may be phenyl, naphthyl or biphenyl. In another embodiment, $Ar_1$ and/or $Ar_2$ may be a substituted $C_3$-$C_{30}$ aryl group. In another embodiment, $Ar_1$ and/or $Ar_2$ is a $C_3$-$C_{30}$ aryl group, such as phenyl, naphthyl or biphenyl, substituted with one or more members selected from the group consisting of $C_1$-$C_{12}$ alkyl, $C_3$-$C_{30}$ aryl, a nitro group and combinations thereof.

In one embodiment, the dihydroxyaromatic compound having amide functionality is diphenolic morpholinamide or 2,2-bis(4-hydroxyphenyl)-1-propaneamide.

The dihydroxyaromatic compounds having amide functionality may be prepared by any conventional manner, such as described in U.S. Pat. No. 3,251,806, which is incorporated herein by reference. In one embodiment, the dihydroxyaromatic compound is prepared by heating an ammonium salt of a parent diphenolic acid compound with a secondary amine.

In one embodiment, the dihaloaromatic sulfone or dinitroaromatic sulfone has formula VI:

wherein X is a halogen or nitro group;

$R^4$, $R^5$, $R^6$ and $R^7$ are each, independently, a nitro group, $C_1$-$C_{12}$ alkyl, $C_3$-$C_{30}$ aryl or a combination thereof;

m and n are each, independently, 0 or 1; and b, c, d and e are each, independently, 0, 1, 2, 3 or 4.

In one embodiment, X is a halogen. In another embodiment, X may be chlorine, bromine or fluorine.

In one embodiment, $R^4$, $R^5$, $R^6$ and/or $R^7$ is methyl, ethyl, propyl, isopropyl, butyl, hexyl, heptyl, octyl, 4-methylpent-1-yl, phenyl, naphthyl or biphenyl.

In another embodiment, b, c, d and/or e are 0. In another embodiment, b, c, d and e are 0.

Examples of the dihaloaromatic sulfone include, but are not limited to, bis(4-chlorophenyl)sulfone, bis(4-fluorophenyl)sulfone, 4,4'-bis[(4-chlorophenyl)sulfonyl]-1,1'-biphenyl or 4,4'-bis[(4-fluorophenyl)sulfonyl]-1,1'-biphenyl. Functionalized polysulfones are readily available commercially.

The dihydroxyaromatic compound having amide functionality and the dihaloaromatic sulfones or dinitroaromatic sulfones are reacted in the presence of a base, which converts the dihydroxyaromatic compound to its corresponding alkali metal salt. In one embodiment, the base is a basic salt of an alkali metal compound. Examples of basic salts include, but are not limited to, alkali metal hydroxides, such as, lithium hydroxide, sodium hydroxide, potassium hydroxide, rubidium hydroxide, and cesium hydroxide; alkali metal carbonates, such as, lithium carbonate, sodium carbonate, potassium carbonate, rubidium carbonate, and cesium carbonate; and alkali metal hydrogen carbonates, such as, lithium hydrogen carbonate, sodium hydrogen carbonate, potassium hydrogen carbonate, rubidium hydrogen carbonate and cesium hydrogen carbonate. Combinations of these compounds may also be used to effect the reaction. In one embodiment, the base is present in an effective amount to deprotonate the hydroxyl groups of the dihydroxy aromatic compounds. In another embodiment, the base is present in at least an equimolar amount relative to the molar equivalents of hydroxyl functionality. In another embodiment, the base is present in an excess amount relative to the molar equivalents of hydroxyl functionality.

A solvent may be used in the reaction. The solvent may be a polar aprotic solvent or a chlorinated solvent. Some examples of the aprotic polar solvent that may be effectively used include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone (NMP), N-ethyl-2-pyrrolidone, N-isopropyl-2-pyrrolidone, N-isobutyl-2-pyrrolidone, N-n-propyl-2- pyrrolidone, N-n-butyl-2-pyrrolidone, N-cyclohexyl-2-pyrrolidone, N-methyl-3-methyl-2-pyrrolidone, N-ethyl-3-methyl-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethylsulfoxide (DMSO), diethylsulfoxide, sulfolane, 1-methyl-1-oxosulfolane, 1-ethyl-1-oxosulfolane, 1-phenyl-1-oxosulfolane, N,N'-dimethylimidazolidinone (DMI), diphenylsulfone, and combinations thereof. The amount of solvent to be used is typically an amount that is sufficient to dissolve the dihaloaromatic sulfone or dinitroaromatic sulfone and dihydroxy aromatic compounds. Optionally, phase transfer catalysts may be employed to increase the rate of reaction and reaction yield. Phase transfer catalysts comprise an anionic species, such as a halide, mesylate, tosylate, tetrafluoroborate or acetate as the charge-balancing counterion(s). Examples of phase transfer catalysts include, but are not limited to, guanidinium salts, aminopyridinium salts, bis-quaternary ammonium salts, bis-quaternary phosphonium salts or phosphazenium salts. Examples of guanidinium salts include, but are not limited to, hexaalkylguanidinium salts or bis-guanidinium salts, such as those disclosed in U.S. Pat. Nos. 5,132,423; 5,116,975 and 5,081,298, which are incorporated herein by reference. In one embodiment, guanidinium salts include, but are not limited to, hexaethylguanidinium chloride, hexaethylguanidinium bromide, hexa-n-butylguanidinium bromide, 1,6-bis(N,N',N',N",N"-penta-n-butylguanidinium)hexane dibromide, 1,6-bis(N-n-butyl-N',N',N",N"-tetraethylguanidinium)hexane dibromide, tris(pentamethylene)guandinium bromide or 1,6-bishexalene(penta-n-butylguanidinium)dibromide. Examples of bis-quaternary ammonium and bis-quaternary phosphonium salts include, but are not limited to, those disclosed in U.S. Pat. No. 4,554,357, which is incorporated herein by reference, such as bis(tri-n-butyl)-1,4-butylenediammonium dibromide, bis(tri-n-butyl)-1,10-decylenediammonium dibromide, bis(tris-n-hexyl)-1,10-decylenediammonium dibromide, bis(tri-n-butyl)-1,6-hexylenediammonium dibromide, N,N'-di-n-butyl-1,4-diazabicyclo[2.2.2]octane dibromide or bis(tri-n-butyl)-1,6-hexylenephosphonium dibromide. In one embodiment, aminopyridinium salts include, but are not limited to, p-dialkylamino-pyridinium salts or bis-dialkylaminopyridinium salts, such as those disclosed in U.S. Pat. No. 4,460,778; U.S. Pat. No. 4,513,141 and U.S. Pat. No. 4,681,949, which are incorporated herein by reference. In one embodiment, aminopyridinium salts include, but are not limited to, N-2-ethylhexyldimethylaminopyridine chloride, N-2-ethylhexyl-4-methyl-piperidinylaminopyridine chloride, neopentyldibutylaminopyridinium bromide, N-neopentyl-4-N'—N'-dibutylaminopyridinium bromide, N-neopentyl-4-N'—N'-dihexylaminopyridinium bromide, tetraethylene glycol-bis(4-dimethylaminopyridinium)bismethanesulfonate, 1,8-bis(4-dimethylaminopyridinium)octane dibromide, 1,10-bis(4-dimethylaminopyridinium)decane dibromide, 1,6-bis(4-di-n-hexylaminopyridinium)hexane dibromide, bisaminopyridinium dibromide or 1,10-bis[4-(4-methyl-1-piperdinylpyridinium)decane]dibromide.

The phase transfer catalyst may be used in any amount effective for increasing the rate of reaction or increasing the yield of the reaction. In one embodiment, the phase transfer catalyst is added in an amount of from about 0.5 mole percent to about 5.0 mole percent based on the molar amount of the dihydroxyaromatic compound. In another embodiment, the phase transfer catalyst is added in an amount of from about 0.25 mole percent to about 2.5 mole percent based on the molar amount of the dihydroxyaromatic compound.

In one embodiment, the dihydroxyaromatic compound having amide functionality and the dihaloaromatic sulfone or dinitroaromatic sulfone are reacted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the dihydroxy compound and the dihaloaromatic sulfone or the dinitroaromatic sulfone. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

The dihaloaromatic sulfone or the dinitroaromatic sulfone may be used in substantially equimolar amounts relative to the dihydroxy aromatic compounds used in the reaction mixture. The term "substantially equimolar amounts" means a molar ratio of the dihaloaromatic sulfone or dinitroaromatic sulfone to the dihydroxy aromatic compounds having amide functionality is from about 0.85 to about 1.2 moles of the dihaloaromatic sulfone or dinitroaromatic sulfone to about 1.0 mole of the dihydroxy aromatic compound. In another embodiment, the ratio is from about 0.9 to about 1.1 moles of the dihaloaromatic sulfone or dinitroaromatic sulfone to about 1.0 mole of the dihydroxy aromatic compound and from about 0.98 to about 1.02 moles of the dihaloaromatic sulfone or dinitroaromatic sulfone to about 1.0 mole of the dihydroxy aromatic compound.

The polymer is added to the reaction mixture and is polymerized with the polyarylether having amide functionality. In one embodiment, the polyarylether having amide functionality and polymer are reacted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the polyarylether having amide functionality and the polymer. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

After completing the reaction, the polyarylether block copolymer may be separated from the inorganic salts, precipitated into a non-solvent and collected by filtration and drying. The drying may be carried out either under vacuum and/or at high temperature, as is known commonly in the art. Examples of non-solvents include water, methanol, ethanol, propanol, butanol, acetone, methyl ethyl ketone, methyl isobutyl ketone, gamma-butyrolactone or combinations thereof. In one embodiment, water or methanol are used as the non-solvents.

The polymer may be any type of polymer suitable for forming a block copolymer with the polyarylether having amide functionality. The polymer may be prepared separately and polymerized with the polyarylether having amide functionality or may be prepared in situ following the polymerization reaction with the polyarylether having amide functionality. In one embodiment, the polymer is prepared by reacting a dihydroxyaromatic compound with a dihaloaromatic sulfone or dinitroaromatic sulfone in the presence of a base. In another embodiment, the polymer is prepared by adding a dihydroxyaromatic compound and a dihaloaromatic sulfone or dinitroaromatic sulfone to the reaction mixture after the polyarylether having amide functionality has been prepared.

The dihydroxyaromatic compound includes, but is not limited to, bis(4-hydroxyphenyl)sulfide, bis(4-hydroxyphenyl)ether, bis(4-hydroxyphenyl)sulfone, bis(4-hydroxyphenyl)sulfoxide, 4,4'-(phenylphosphinyl)diphenol, 5-cyano-1,3-dihydroxybenzene, 4-cyano-1,3-dihydroxybenzene, 2-cyano-1,4-dihydroxybenzene, 2-methoxyhydroquinone, 2,2'-dimethylbiphenol, 2,2',6,6'-tetramethylbiphenol, 2,2',3,3',6,6'-hexamethylbiphenol, 3,3',5,5'-tetrabromo-2,2',6,6'-tetramethylbiphenol, 2,2'-bis(4-hydroxyphenyl)hexafluoropropane, 4,4'-(3,3,5-trimethylcyclohexylidene)diphenol, 1,1-bis(4-hydroxy-3-methylphenyl)cyclohexane, 4,4'-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,2-bis(4-hydroxyphenyl)butane, 2,2-bis(4-hydroxyphenyl)-2-methylbutane, 1,1-bis(4-hydroxyphenyl)cyclohexane, 2-(3-methyl-4-hydroxyphenyl-2-(4-hydroxyphenyl)propane, 2-(3,5-dimethyl-4-hydroxyphenyl)-2-(4-hydroxyphenyl)propane, 2-(3-methyl-4-hydroxyphenyl)-2-(3,5-dimethyl-4-hydroxyphenyl)propane, bis(3,5-dimethylphenyl-4-hydroxyphenyl)methane, 1,1-bis(3,5-dimethylphenyl-4-hydroxyphenyl)ethane, 2,2-bis(3,5-dimethylphenyl-4-hydroxyphenyl)propane, 2,4-bis(3,5-dimethylphenyl-4-hydroxyphenyl)-2-methylbutane, 3,3-bis(3,5-dimethylphenyl-4-hydroxyphenyl)pentane, 1,1-bis(3,5-dimethylphenyl-4-hydroxyphenyl)cyclopentane, 1,1-bis(3,5-dimethylphenyl-4-hydroxyphenyl)cyclohexane, bis(3,5-dimethyl-4-hydroxyphenyl)sulfoxide, bis(3,5-dimethyl-4-hydroxyphenyl)sulfone, bis(3,5-dimethylphenyl-4-hydroxyphenyl)sulfide, 2-carbamoylhydroquinone, 2,3-dicarbamoylhydroquinone, 2,2-bis(4-hydroxyphenyl)propane (bisphenol-A), resorcinol, catechol, hydroquinone, 2,6-dihydroxy naphthalene, 2,7-dihydroxynapthalene, 4,4'-dihydroxyphenyl sulfoxide, 2,4'-dihydroxyphenyl sulfoxide, 2-diphenylphosphinylhydroquinone, bis(2,6-dimethylphenol) 2,2'-biphenol, 4,4'-biphenol, 4,4'-bis(3,5-dimethyl)biphenol, 4,4'-bis(2,3,5-trimethyl)biphenol. 4,4'-bis(2,3,5,6-tetramethyl)biphenol, 4,4'-bis(3-bromo-2,6-dimethyl)biphenol, 4,4'-isopropylidenebis(2,6-dibromophenol) (tetrabromobisphenol A), 4,4'-isopropylidenebis(2,6-dimethylphenol) (tetramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'-isopropylidene-bis(2-phenylphenol), 4,4'(1,3-phenylenediisopropylidene)bisphenol (bisphenol M), 4,4'-(1,4-phenylenediisoproylidene)bisphenol (bisphenol P), 4,4'-sufonylbis(2,6-dimethylphenol), 4,4'-hexafluoroisoproylidene)bisphenol (Bisphenol AF), 4,4'-hexafluoroisopropylidene)bis(2,6-dimethylphenol), 4,4'(1-phenylethylidene)bisphenol (Bisphenol AP), 4,4'-(1-phenylethylidene)bis(2,6-dimethylphenol), 3,3-(4-hydroxyphenyl)pentane, bis(4-hydroxyphenyl)-2,2-dichloroethylene (Bisphenol C), bis(2,6-dimethyl-4-hydroxyphenyl)methane, 4,4'-(cyclopentylidene)diphenol, 4,4'-(cyclohexylidene)bis(2-methylphenol), 4.4'-bis(4-hydroxyphenyl)diphenyl ether, 9,9-bis(3-methyl-4-hydroxyphenyl)fluorene, N-phenyl-3,3-bis-(4-hydroxyphenyl)phthalimide, 4,4'-(cyclododecylidene)diphenol, 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol) or dicyclopentadienyl bisphenol.

The dihaloaromatic sulfone or dinitroaromatic sulfone and base are defined above. The amount of base is the amount needed to deprotonate the hydroxyl groups of the dihydroxy aromatic compound. In one embodiment, the base is present in at least an equimolar amount relative to the molar equivalents of hydroxy functionality. In another embodiment, the base is present in an excess amount relative to the molar equivalents of hydroxyl functionality.

In one embodiment, the reaction to prepare the polymer is conducted at a temperature ranging from about 100° C. to about 300° C. In another embodiment, the temperature is in a range from about 120° C. to about 200° C. In another embodiment, the reaction temperature is in a range from about 150° C. to about 200° C.

The reaction to prepare the polymer is conducted for a time sufficient to react the dihydroxyaromatic compound and the dihaloaromatic or dinitroaromatic compound. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

The dihaloaromatic sulfone or dinitroaromatic sulfone may be used in substantially equimolar amounts relative to the dihydroxy aromatic compound. The term "substantially equimolar amounts" means a molar ratio of the dihaloaromatic sulfone or dinitroaromatic sulfone to the dihydroxy aromatic compound is from about 0.85 to about 1.2 moles of the dihaloaromatic sulfone or dinitroaromatic sulfone to about 1.0 mole of the dihydroxy aromatic compound. In another embodiment, the ratio is from about 0.9 to about 1.1 moles of the dihaloaromatic sulfone or dinitroaromatic sulfone to about 1.0 mole of the dihydroxy aromatic compound and from about 0.98 to about 1.02 moles of the dihaloaromatic sulfone or dinitroaromatic sulfone to about 1.0 mole of the dihydroxy aromatic compound.

In one embodiment, the block copolymer may comprise from about 1 percent by weight to about 99 percent by weight of polyarylether units having amide functionality. In another embodiment, the block copolymer has from about 50 percent by weight to about 90 percent by weight of polyarylether units having amide functionality. In another embodiment, the block copolymer may comprise polymer units from about 1 percent by weight to about 99 percent by weight. In another embodiment, the polymer units are present from about 10 percent by weight to about 50 percent by weight.

The polymer is any polymer suitable for polymerizing with the polyarylether having amide functionality. In one embodiment, the polymer comprises units from formula IX or X:

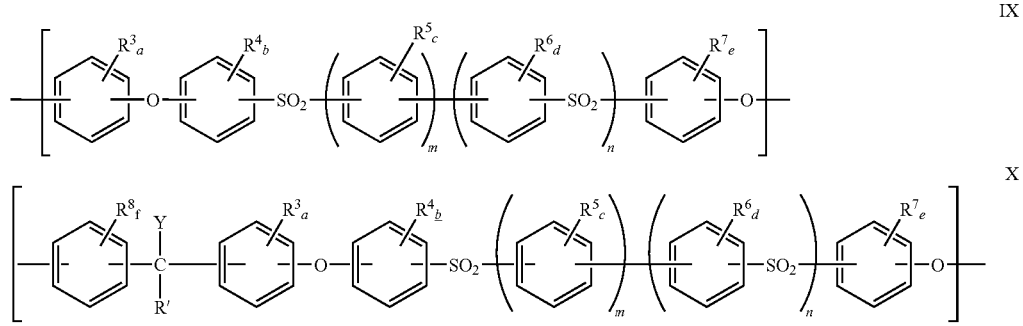

IX

X wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl. In one embodiment, R' may be methyl, ethyl, propyl, isopropyl, butyl, hexyl, heptyl, octyl, 4-methylpent-1-yl, phenyl, naphthyl or biphenyl.

In one embodiment, a polyarylether block copolymer comprises (A) units from at least one of structure I or structure II:

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are independently 0 or 1; and (B) units from a polymer.

In one embodiment, $R_1$ and/or $R_2$ may be methyl, ethyl, propyl, isopropyl, butyl, hexyl, heptyl, octyl, 4-methylpent-1-yl, phenyl, furanyl, thienyl, naphthyl or biphenyl. In another embodiment, $R_1$ and $R_2$ are covalently connected to form a cyclic moiety. In one embodiment, $R_1$ and $R_2$ form a cycloalkyl group. In another embodiment, $R_1$ and $R_2$ form a cyclohexyl group. In another embodiment, $R_1$ and $R_2$ are covalently connected through an oxygen atom to form a cyclic moiety. In one embodiment, $R_1$ and $R_2$ form a 6-membered ring containing an oxygen atom. In another embodiment, $R_1$ and $R_2$ form a morpholyl group or a diethylene imidyl oxide ring.

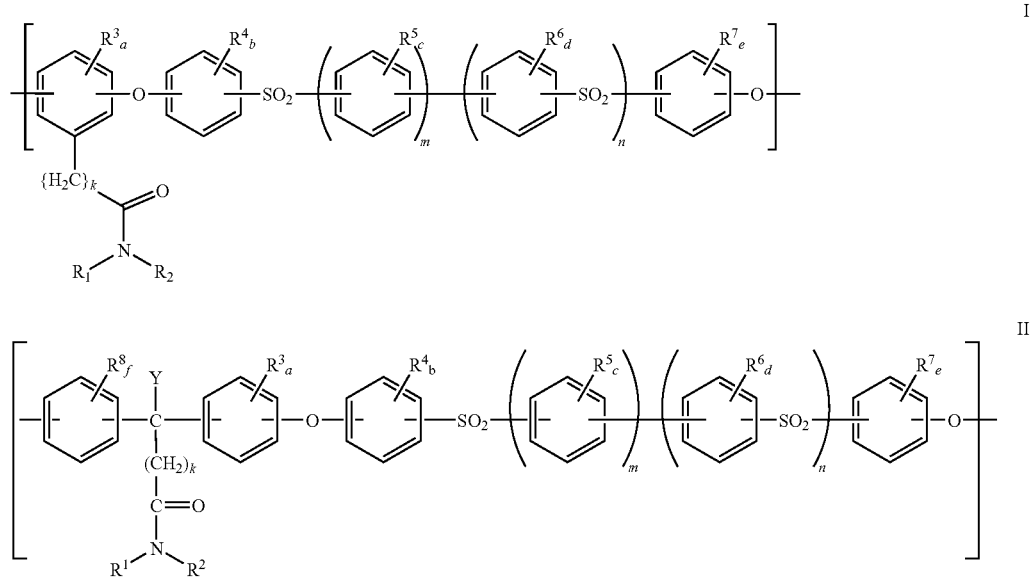

I

II wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is in a range of from about 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, the polyarylether block copolymer having amide functionality has (A) the units of structure III:

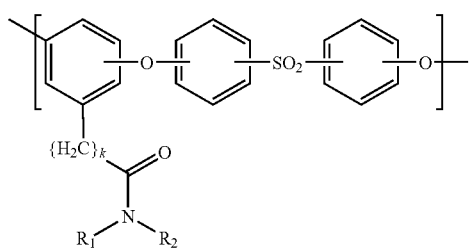

III wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10; and (B) units from a polymer.

In one embodiment, $R_1$ and/or $R_2$ may be methyl, ethyl, propyl, isopropyl, butyl, hexyl, heptyl, octyl, 4-methylpent-1-yl, phenyl, naphthyl or biphenyl. In another embodiment, $R_1$ and $R_2$ are covalently connected to form a cyclic moiety. In one embodiment, $R_1$ and $R_2$ form a cycloalkyl group. In another embodiment, $R_1$ and $R_2$ form a cyclohexyl group. In another embodiment, $R_1$ and $R_2$ are covalently connected through an oxygen atom to form a cyclic moiety. In one embodiment, $R_1$ and $R_2$ form a 6-membered ring containing an oxygen atom. In another embodiment, $R_1$ and $R_2$ form a morpholyl group or a diethylene imidyl oxide ring.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

The polyarylether block copolymers having amide functionality are hydrophilic, but are not water soluble. The block copolymers may be linear, branched or hyperbranched. They are solvent resistant with a high glass transition temperature. In one embodiment, the glass transition temperature, $T_g$, of the polymer ranges from about 120° C. to about 280° C. In another embodiment, the polymer ranges from about 140° C. to about 250° C. In another embodiment, the $T_g$ ranges from about 140° to about 225° C., including from about 175° C. to about 225° C.

The polyaryletheramide block copolymer may be characterized by number average molecular weight ($M_n$) and weight average molecular weight ($M_w$). The various average molecular weights $M_n$ and $M_w$ are determined by techniques, such as gel permeation chromatography, and are known to those skilled in the art. In one embodiment, the $M_n$ of the polymer may be in the range from about 10,000 g/mol to about 1,000,000 g/mol. In another embodiment, the $M_n$ ranges from about 15,000 g/mol to about 200,000 g/mol. In another embodiment, the $M_n$ ranges from about 20,000 g/mol to about 100,000 g/mol. In another embodiment, the $M_n$ ranges from about 40,000 g/mol to about 80,000 g/mol.

In one embodiment, the $M_w$ of the polymer is in the range from about 10,000 g/mol to about 5,000,000 g/mol. In another embodiment, the $M_w$ ranges from about 15,000 g/mol to about 1,000,000 g/mol. In another embodiment, the $M_w$ ranges from about 20,000 g/mol to about 500,000 g/mol. In another embodiment, the $M_n$ ranges from about 40,000 g/mol to about 400,000 g/mol.

In one embodiment, the polyarylether block copolymer having amide functionality is blended with at least one resin. The selection of the resin imparts different properties to the blend, such as improved heat resistance, biocompatibility, and the like. In another embodiment, a blend comprises a polyarylether block copolymer having amide functionality and one or more resins, the polyarylether block copolymer having amide functionality comprises units from at least one of structure I or structure II:

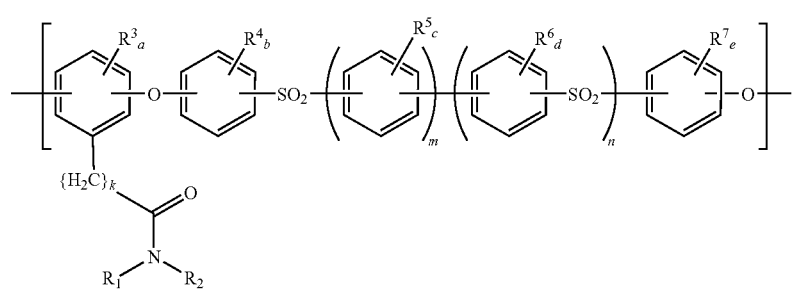

I

-continued

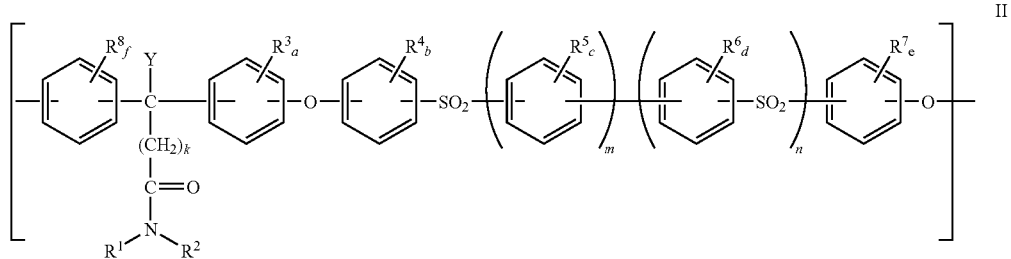

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

In one embodiment, $R_1$ and/or $R_2$ may be methyl, ethyl, propyl, isopropyl, butyl, hexyl, heptyl, octyl, 4-methylpent-1-yl, phenyl, naphthyl or biphenyl. In another embodiment, $R_1$ and $R_2$ are covalently connected to form a cyclic moiety. In one embodiment, $R_1$ and $R_2$ form a cycloalkyl group. In another embodiment, $R_1$ and $R_2$ form a cyclohexyl group. In another embodiment, $R_1$ and $R_2$ are covalently connected through an oxygen atom to form a cyclic moiety. In one embodiment, $R_1$ and $R_2$ form a 6-membered ring containing an oxygen atom. In another embodiment, $R_1$ and $R_2$ form a morpholyl group or a diethylene imidyl oxide ring.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

The resin may be hydrophilic or hydrophobic in nature. Examples of resins that may be blended with the polyarylether having amide functionality include polysulfone, polyether sulfone, polyether urethane, polyphenylene sulfone, polyamide, polyether-amide, polyacrylonitrile, polyvinylpyrrolidone (PVP), polyoxazoline, polyethyleneglycol, polypropylene glycol, polyglycolmonoester, copolymers of polyethyleneglycol with polypropylene glycol, water-soluble cellulose derivatives, polysorbate, polyethylene-polypropylene oxide copolymers or polyethyleneimines.

In one embodiment, the blend comprises from about 20 to about 99 percent by weight polyarylether block copolymer having amide functionality and from about 1 to about 80 percent by weight of a resin, based on the weight of the blend. In another embodiment, the blend comprises from about 50 to about 97.5 percent by weight block copolymer and from about 2.5 to about 50 percent by weight of the resin, based on the weight of the blend. In another embodiment, the blend comprises from about 75 to about 95 percent by weight block copolymer and from about 5 to about 25 percent by weight of the resin, based on the weight of the blend.

In one embodiment, the resin is PVP. PVP is a polymer that easily dissolves in water and can be eluted with water or blood from a membrane, such as a hollow fiber membrane. PVP can be insolubilized by cross-linking. When PVP is completely insolubilized, it will not elute from a membrane, but will also diminish hydrophilic properties in the membrane. In one embodiment, a portion of PVP is insolubilized by crosslinking. In another embodiment, from about 5 to about 50 percent by weight of the PVP is crosslinked. In this range, the elution of the PVP is inhibited, while the blend maintains hydrophilic properties.

PVP may be crosslinked by known methods. U.S. Pat. Nos. 6,432,309 and 5,543,465, incorporated herein by reference, disclose methods for crosslinking PVP. Some exemplary methods of crosslinking include, but are not limited to, exposing it to heat, radiation, such as X-rays, alpha rays, beta rays, gamma rays, ultraviolet rays, visible radiation, infrared radiation, electron beams, or by chemical methods such as, but not limited to, treating PVP with a crosslinker, such as potassium peroxodisulfate or ammonium peroxopersulfate, at temperatures ranging from about 20° C. to about 80° C. in an aqueous medium at pH ranges of from about 4 to about 9, and for a time period ranging from about 5 minutes to about 60 minutes.

PVP may be obtained by polymerizing an N-vinylpyrrolidone using standard addition polymerization techniques known in the art. One polymerization procedure involves the free radical polymerization using initiators, such as azobisisobutyronitrile (AIBN), optionally, in the presence of a solvent. PVP is also commercially available under the tradenames PLASDONE® from ISP COMPANY or KOLLIDON® from BASF.

In another embodiment, a method for making a blend comprises mixing a polyarylether copolymer having amide functionality and one or more resins, wherein said polyarylether copolymer having amide functionality comprises units from at least one of structure I or structure II:

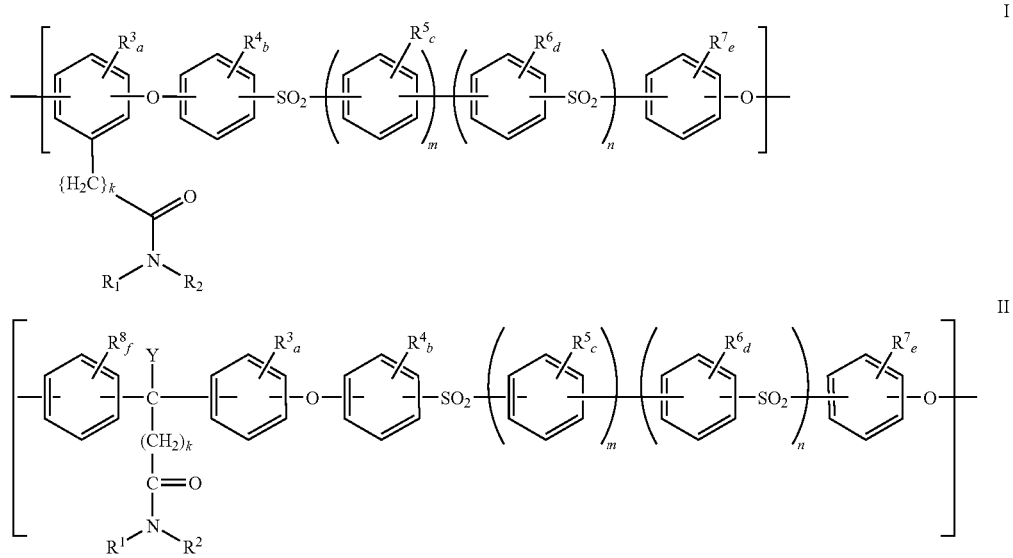

wherein $R_1$ and $R_2$ are separate groups or are covalently connected to form a cyclic moiety, $R_1$ and $R_2$ are each, independently, selected from the group consisting of hydrogen, $C_{1-20}$ alkyl, $C_{3-30}$ aryl and a substituted $C_{3-30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_{1-20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

In one embodiment, $R_1$ and/or $R_2$ may be methyl, ethyl, propyl, isopropyl, butyl, hexyl, heptyl, octyl, 4-methylpent-1-yl, phenyl, furanyl, thienyl, naphthyl or biphenyl. In another embodiment, $R_1$ and $R_2$ are covalently connected to form a cyclic moiety. In one embodiment, $R_1$ and $R_2$ form a cycloalkyl group. In another embodiment, $R_1$ and $R_2$ form a cyclohexyl group. In another embodiment, $R_1$ and $R_2$ are covalently connected through an oxygen atom to form a cyclic moiety. In one embodiment, $R_1$ and $R_2$ form a 6-membered ring containing an oxygen atom. In another embodiment, $R_1$ and $R_2$ form a morpholyl group or a diethylene imidyl oxide ring.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In order that those skilled in the art will be better able to practice the present disclosure, the following examples are given by way of illustration and not by way of limitation.

EXAMPLES

Example 1

Synthesis of Polyarylether Block Co-Polymer Having Amide Functionality

Diphenolic Morpholinamide (2.346 g, 6.6 mmol) and difluorophenyl sulfone (1.846 g, 7.26 mmol) were added to a three-neck flask installed with a Dean-Stark Condenser, a dropping funnel, and a mechanical stir. $K_2CO_3$ (2.764 g, 20 mmol), NMP (7 ml) and toluene (4 ml) were added to the flask. The solution was heated to 180° C. to remove water and toluene by azeotropic distillation. After 3.2 hours, the solution was removed from the heat. BPA (1.657 g, 7.26 mmol) and bis(4-fluorophenyl)sulfone (1.678 g, 6.6 mmol) were added, which was followed by the addition of NMP (3 ml) and toluene (4 ml). The reaction mixture was heated to 150-155° C. After 3 hours, the solution became very viscous. During cooling, 20 ml of NMP was added to the mixture. The solution was precipitated in water, and washed with water and methanol. The polymer was dried to yield about 5.0 g polyarylether block copolymer having amide functionality (Mw=70,000, Tg=187° C.).

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

The invention claimed is:

1. A polyarylether block copolymer having amide functionality comprising (A) units from at least one of structure I or structure II:

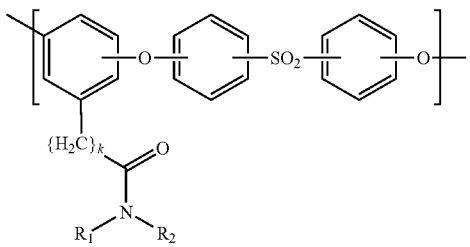

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are independently 0 or 1; and (B) units from a polymer.

2. The polyarylether of claim 1 wherein the polyarylether having amide functionality comprises units of structure III:

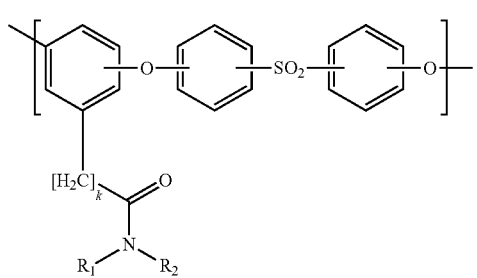

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10.

3. The polyarylether of claim 1 having a glass transition temperature from about 120° C. to about 280° C.

4. The polyarylether of claim 1 wherein the polymer comprises units from formula IX or X:

wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

5. A method for making a polyarylether block copolymer having amide functionality comprising reacting a dihydroxyaromatic compound having amide functionality with a dihaloaromatic sulfone or dinitroaromatic sulfone in the presence of a base to form a polyarylether having amide functionality and reacting the polyarylether with a polymer.

6. The method of claim 5 further comprising adding a solvent.

7. The method of claim 6 further comprising adding a phase transfer catalyst.

8. The method of claim 5, wherein the dihydroxyaromatic compounds having amide functionality comprises structure IV or V:

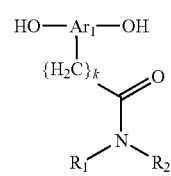

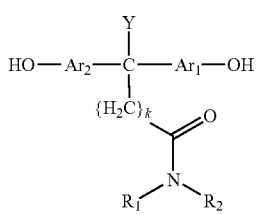

wherein $R_1$ and $R_2$ are separate groups or are covalently bonded to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

k is from about 0 to about 10;

Y is hydrogen, $C_1$-$C_{20}$ alkyl or $C_3$-$C_{30}$ aryl; and $Ar_1$ and $Ar_2$ are each, independently, a $C_3$-$C_{30}$ aryl group, a $C_3$-$C_{30}$ aromatic-aliphatic group or a substituted $C_3$-$C_{30}$ substituted aryl group.

9. The method of claim 5 wherein the dihaloaromatic sulfone or the dinitroaromatic sulfone comprises formula VI:

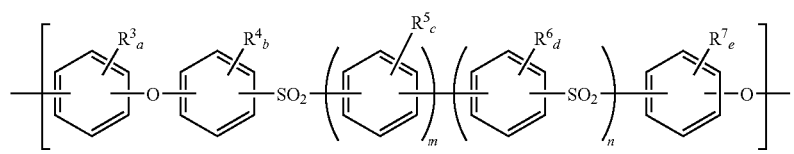

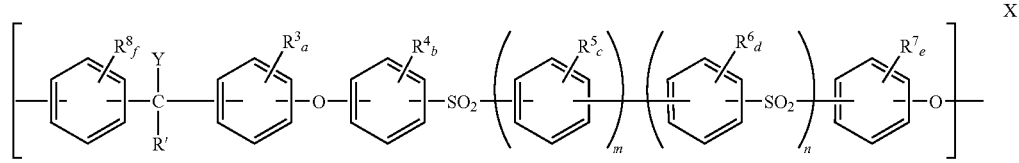

wherein X is

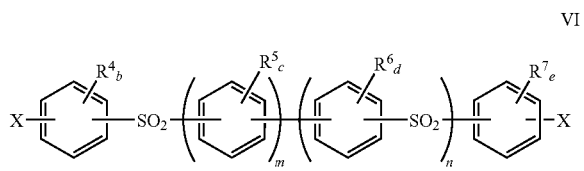

$R^4$, $R^5$, $R^6$ and $R^7$ are each, independently, a nitro group, $C_1$-$C_{12}$ alkyl, $C_3$-$C_{30}$ aryl or a combination thereof;

and from about 1 percent by weight to about 99 percent by weight polymer, based on the weight of the block copolymer.

17. The method of claim 5 wherein the polymer is prepared by reacting a dihydroxyaromatic compound with a dihaloaromatic sulfone or dinitroaromatic sulfone in the presence of a base.

18. A blend comprising a polyarylether block copolymer having amide functionality and one or more resins, the polyarylether block copolymer having amide functionality comprises (A) units from at least one of structure I or structure II:

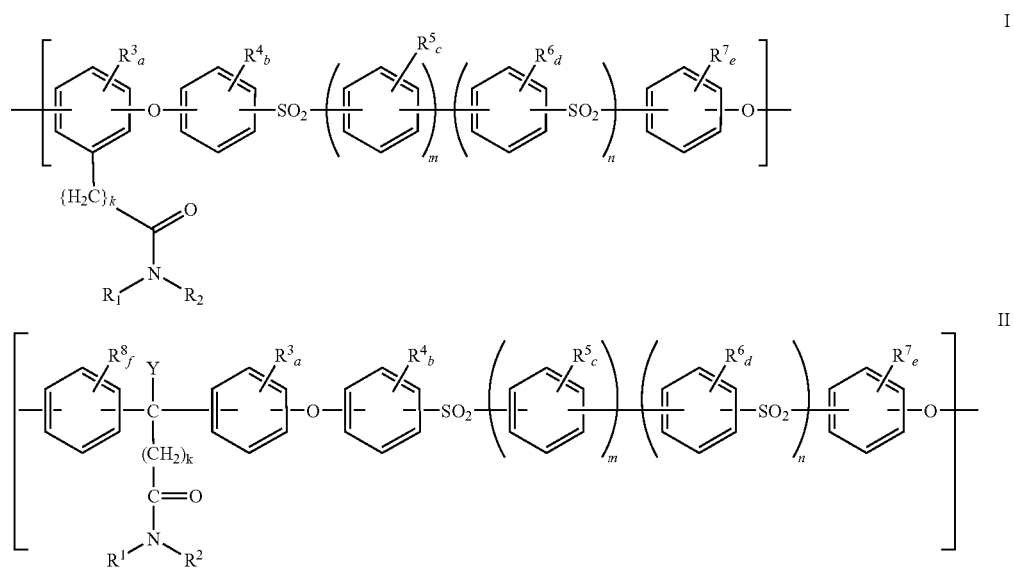

m and n are each, independently, 0 or 1; and b, c, d and e are each, independently, 0, 1, 2, 3 or 4.

10. The method of claim 9 wherein the dihaloaromatic sulfone is selected from the group consisting of bis(4-chlorophenyl)sulfone, bis(4-fluorophenyl)sulfone, 4'-bis[(4-chlorophenyl)sulfonyl]-1,1'-biphenyl and 4,4'-bis[(4-fluorophenyl)sulfonyl]-1,1'-biphenyl.

11. The method of claim 5 wherein the base is a basic salt of an alkali metal compound.

12. The method of claim 11 wherein the base is selected from the group consisting of alkali metal hydroxide, alkali metal carbonate, alkali metal hydrogen carbonates and combinations thereof.

13. The method of claim 7 wherein the phase transfer catalysts are selected from the group consisting of guanidinium salts, aminopyridinium salts, bis-quaternary ammonium salts, bis-quaternary phosphonium salts and phosphazenium salts.

14. The method of claim 5 wherein the temperature of the reaction is from about 100° C. to about 300° C.

15. The method of claim 5 wherein the time of the reaction is from about 1 hour to about 72 hours.

16. The method of claim 5 wherein the block copolymer comprises from about 1 percent by weight to about 99 percent by weight of polyarylether units having amide functionality wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

19. The blend of claim 18 wherein the polyarylether having amide functionality has the units of structure III:

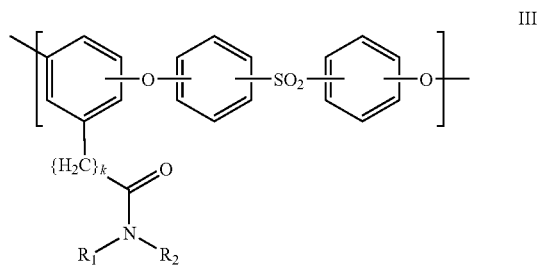

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10.

20. A method for making a blend comprises mixing a polyarylether block copolymer having amide functionality and one or more resins, wherein said polyarylether block copolymer having amide functionality comprises (A) units from at least one of structure I or structure II:

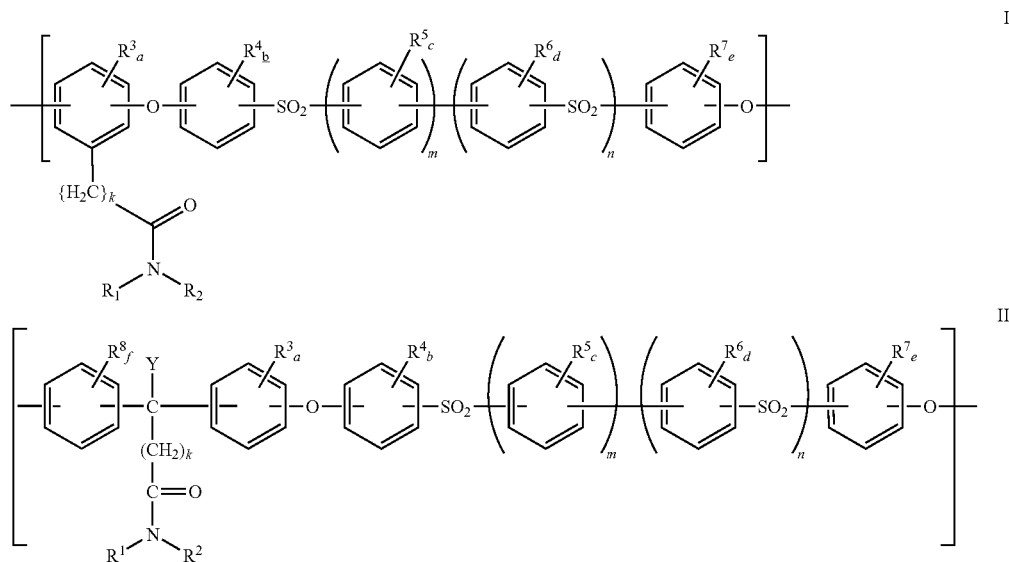

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1; and (B) units from a polymer.

* * * * *